(12) United States Patent
Wang et al.

(10) Patent No.: US 10,621,094 B2
(45) Date of Patent: Apr. 14, 2020

(54) COARSE TAG REPLACEMENT

(71) Applicant: Intel Corporation, Santa Clara, CA (US)

(72) Inventors: Zhe Wang, Hillsboro, OR (US); Zeshan A. Chishti, Beaverton, OR (US); Nagi Aboulenein, King City, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/636,072

(22) Filed: Jun. 28, 2017

(65) Prior Publication Data

US 2019/0004952 A1 Jan. 3, 2019

(51) Int. Cl.
*G06F 12/08* (2016.01)
*G06F 12/0846* (2016.01)
*G06F 12/128* (2016.01)
*G06F 12/0895* (2016.01)

(52) U.S. Cl.
CPC ...... *G06F 12/0846* (2013.01); *G06F 12/0895* (2013.01); *G06F 12/128* (2013.01); *G06F 2212/604* (2013.01)

(58) Field of Classification Search
CPC .............. G06F 12/082; G06F 12/0846; G06F 12/0862; G06F 12/0895; G06F 12/128; G06F 2212/69
USPC ................................ 711/128, 133, 207, 209
See application file for complete search history.

(56) References Cited

U.S. PATENT DOCUMENTS

| | | | |
|---|---|---|---|
| 6,161,167 A * | 12/2000 | Witt | G06F 9/3824 |
| | | | 711/122 |
| 6,785,793 B2 | 8/2004 | Aboulenein et al. | |
| 8,245,111 B2 | 8/2012 | Chishti et al. | |
| 8,612,676 B2 | 12/2013 | Dahlen et al. | |
| 9,378,021 B2 | 6/2016 | Chishti et al. | |
| 9,418,723 B2 | 8/2016 | Chishti et al. | |
| 9,514,047 B2 | 12/2016 | Greenspan et al. | |
| 2009/0094418 A1* | 4/2009 | Warner | G06F 12/082 |
| | | | 711/144 |
| 2015/0186284 A1* | 7/2015 | Butler | G06F 12/0864 |
| | | | 711/128 |
| 2018/0165202 A1* | 6/2018 | Balakrishnan | G06F 12/0853 |

* cited by examiner

Primary Examiner — Gary J Portka
(74) Attorney, Agent, or Firm — Jordan IP Law, LLC

(57) ABSTRACT

An embodiment of a memory apparatus may include a tag cache to cache tag information, and a memory controller communicatively coupled to the tag cache to determine if a request for a memory line results in a tag cache miss, bring tag information for the missed memory line into the tag cache if the request results in a cache miss, and bring tag information for at least one additional memory line adjacent to the missed memory line into the tag cache if the request results in a cache miss. Additional embodiments are disclosed and claimed.

16 Claims, 4 Drawing Sheets

COARSE TAG REPLACEMENT

TECHNICAL FIELD

Embodiments generally relate to memory systems. More particularly, embodiments relate to coarse tag replacement.

BACKGROUND

Computing systems or platforms may utilize various memory arrangements. A two-level memory (2LM) system may include near memory (NM) and far memory (FM). A tag cache may cache tag and/or metadata information related to cache entries.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory. Nonvolatile memory may be a storage medium that does not require power to maintain the state of data stored by the medium. In one embodiment, the memory device may include a block addressable memory device, such as those based on NAND or NOR technologies. A memory device may also include future generation non-volatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), PCM with switch (PCMS), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
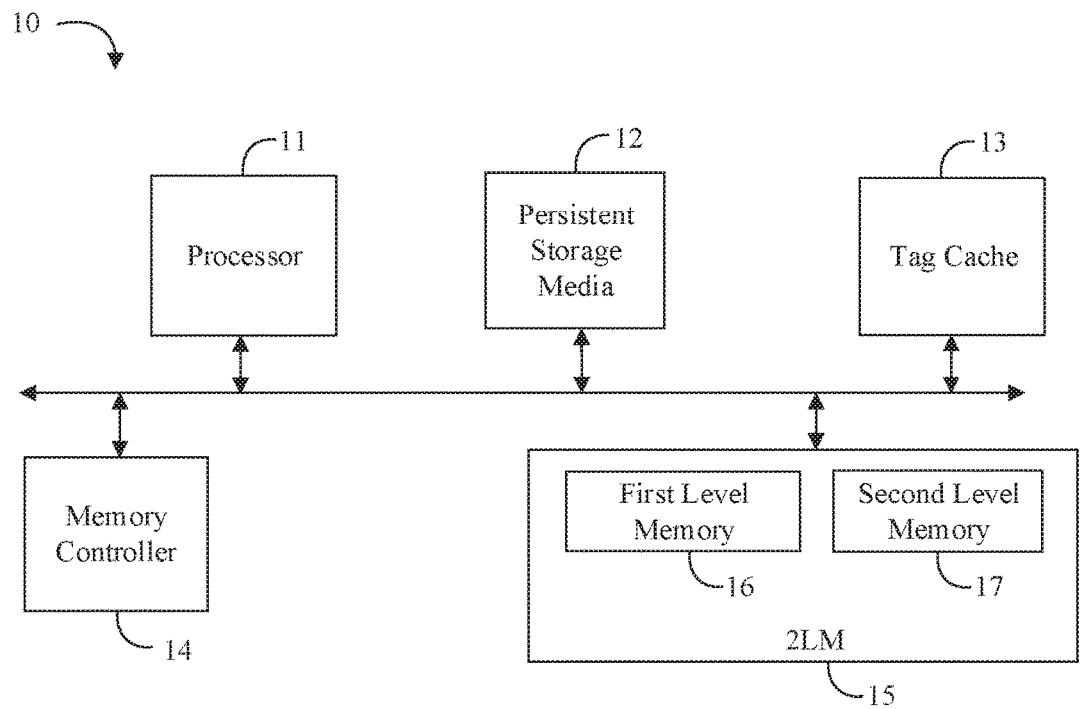
FIG. 1 is a block diagram of an example of an electronic processing system according to an embodiment.

Turning now to FIG. 1, an embodiment of an electronic processing system 10 may include a processor 11, persistent storage media 12 communicatively coupled to the processor 11, a tag cache 13 to cache tag information, and a memory controller 14 communicatively coupled to the processor 11 and the tag cache 13 to determine if a request for a memory line results in a tag cache miss, bring tag information for a group of memory lines into the tag cache 13 if the request results in a tag cache miss (e.g., the group of memory lines including the missed memory line and at least one additional memory line adjacent to the missed memory line), and provide a group identification for a group of tag cache entries which correspond to the group of memory lines. For example, the group identification may correspond to a group of ways. The persistent storage media may include non-volatile storage, such as a hard-disk drive (HDD), a solid-state drive (SSD), a flash drive, etc.

The system 10 may further include a two-level memory (2LM) 15 including a first level memory 16 and a second level memory 17. In various embodiments, any of the first level memory 16 and the second level memory 17 may include NVM and/or volatile memory. For example, the 2LM 15 may correspond to system memory or main memory having a near memory and a far memory. The first level memory 16 may correspond to the near memory and include smaller, faster DRAM. The second level memory 17 may correspond to the far memory and include larger storage capacity NVM (e.g. byte-addressable 3D crosspoint memory). For example, the tag cache 13 may cache tag and/or metadata information of the near memory (e.g., the first level memory 16).

In accordance with some embodiments, the group identification may be based on a corresponding way identification. For example, the group identification may be determined from leading bits of a corresponding way identification. In some embodiments, the memory controller may be configured to provide a group replacement state for the group of tag cache entries. For example, the memory controller 14 may be further configured to select a group of tag cache entries for eviction (e.g., a victim group) based on the group replacement state of the group of tag cache entries.

Embodiments of each of the above processor 11, persistent storage media 12, tag cache 13, memory controller 14, 2LM 15, near memory 16, far memory 17, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as RAM, read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the persistent storage media 12, 2LM 15, or other system memory may store a set of instructions which when executed by the processor 11 cause the system 10 to implement one or more components, features, or aspects of the system 10 (e.g., the tag cache 13, the memory controller 14, etc.).

Figure 2:
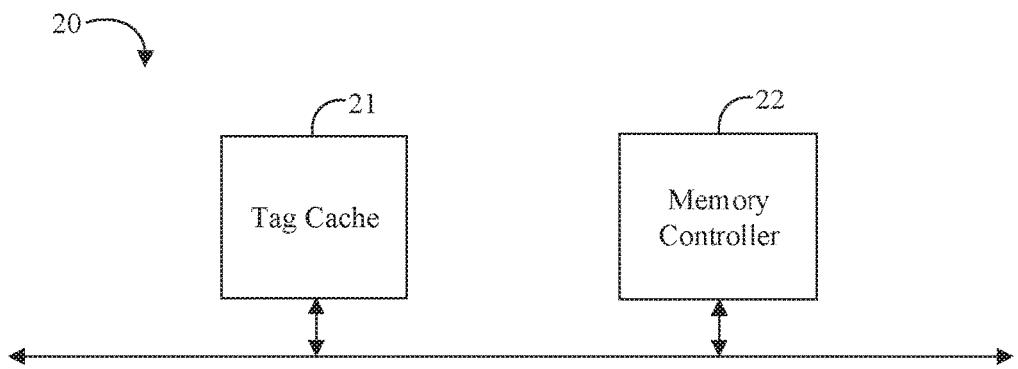
FIG. 2 is a block diagram of an example of a memory apparatus according to an embodiment.

Turning now to FIG. 2, an embodiment of a memory apparatus 20 may include a tag cache 21 to cache tag information, and a memory controller 22 communicatively coupled to the tag cache 21 to determine if a request for a memory line results in a tag cache miss, bring tag information for a group of memory lines into the tag cache 21 if the request results in a tag cache miss (e.g., the group of memory lines including the missed memory line and at least one additional memory line adjacent to the missed memory line), and provide a group identification for a group of tag cache entries which correspond to the group of memory lines. For example, the group identification may correspond to a group of ways. In some embodiments, the group identification may be based on a corresponding way identification. For example, the group identification may be determined from leading bits of the corresponding way identification. In some embodiments, the memory controller 22 may be configured to provide a group replacement state for the group of tag cache entries. For example, the memory controller 22 may be further configured to select a group of tag cache entries for eviction (e.g., a victim group) based on the group replacement state of the group of tag cache entries.

Embodiments of each of the above tag cache 21, memory controller 22, and other components of the apparatus 20 may be implemented in hardware, software, or any combination thereof. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Alternatively, or additionally, these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 3A:
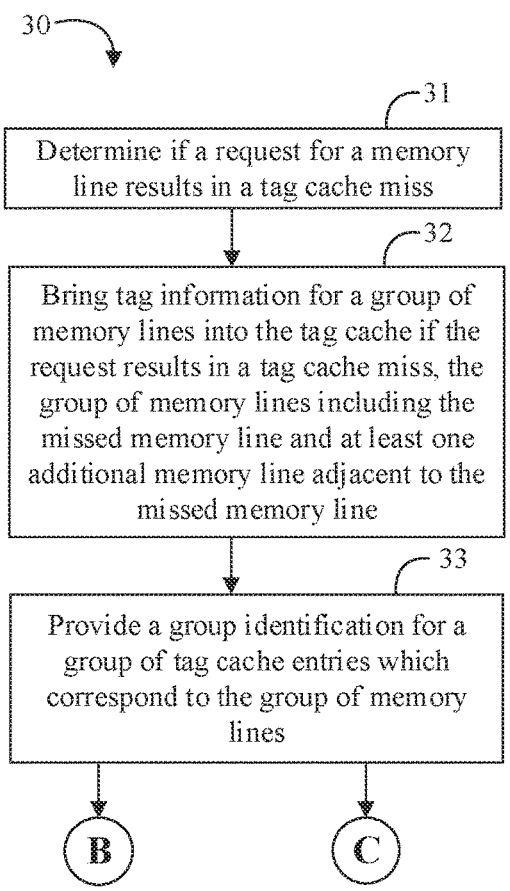
FIGS. 3A to 3C are flowcharts of an example of a method of controlling memory according to an embodiment.
Figure 3B:
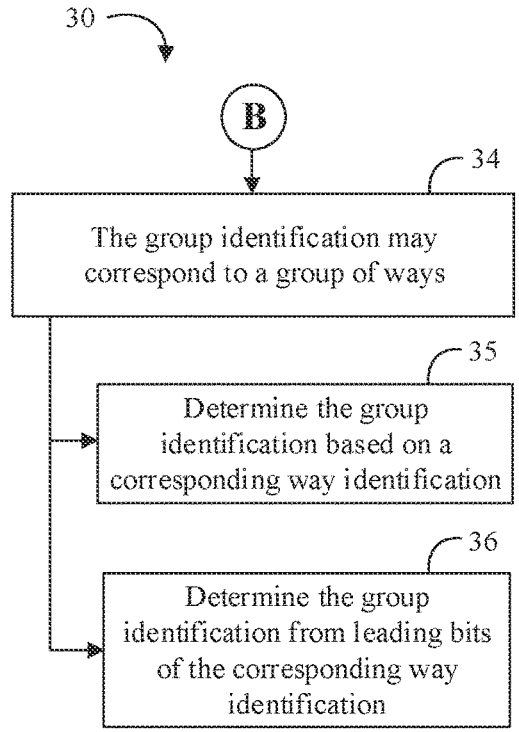
Figure 3C:
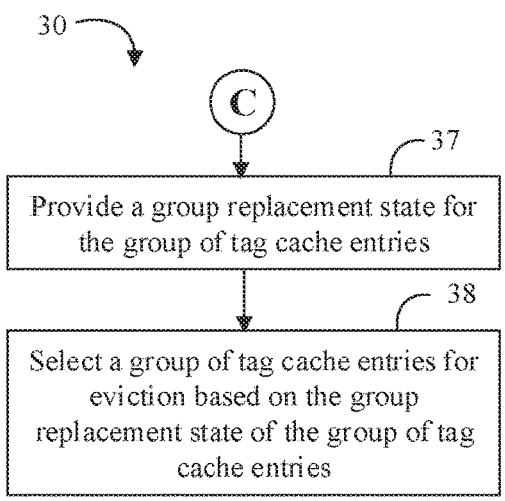

Turning now to FIG. 3, an embodiment of a method 30 of controlling memory may include determining if a request for a memory line results in a tag cache miss at block 31, bringing tag information for a group of memory lines into the tag cache if the request results in a tag cache miss, the group of memory lines including the missed memory line and at least one additional memory line adjacent to the missed memory line, at block 32, and providing a group identification for a group of tag cache entries which correspond to the group of memory lines at block 33. For example, the group identification may correspond to a group of ways at block 34. For example, the method 30 may include determining the group identification based on a corresponding way identification at block 35 and/or determining the group identification from leading bits of the corresponding way identification at block 36. In some embodiments, the method 30 may further include providing a group replacement state for the group of tag cache entries at block 37. The method 30 may also include selecting a group of tag cache entries for eviction based on the group replacement state of the group of tag cache entries at block 38.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages. For example, the method 30 may be implemented on a computer readable medium as described in connection with Examples 19 to 24 below. For example, embodiments or portions of the method 30 may be implemented in applications (e.g., through an application programming interface (API)) or driver software running on an operating system (OS).

Advantageously, some embodiments may provide a coarse grain tag cache replacement policy. Without being limited to particular implementations, a tag cache may be used to cache the metadata and tag information of the near memory (NM) in a two-level memory (2LM) system. The tag cache may be a SRAM structure which may be located in a 2LM controller. On a memory request, the access latency of the tag cache hit request may be much smaller than the tag cache miss request. Within a fixed tag cache capacity budget, improving the tag cache hit rate may improve the system performance. The tag cache replacement policy may be important to the tag cache hit rate. Some other systems may apply a per-line replacement policy which may require a large tag cache capacity to store the way identifications (IDs). Some embodiments may provide a coarse tag cache replacement policy to advantageously achieve a higher tag cache hit rate. In some embodiments, on each tag cache miss the tag and metadata information of the missing line as well as the missing line's N−1 adjacent lines (e.g., where N corresponds to a group size) may be brought into the tag cache.

As opposed to a per-line cache replacement policy, some embodiments may provide an improved tag cache replacement policy which is based on a group and which may be referred to as a coarse grain replacement policy. For example, the tag cache may store group IDs and group least recently used (LRU) replacement states for each group instead of for each line. Instead of storing a way ID and a LRU replacement state for each tag cache entry, some embodiments may store a group ID and a group LRU replacement state for each group. In some embodiments, the group ID may correspond to the leading bits of the way ID (e.g., a leading way ID). Some embodiments may significantly reduce the on-chip storage overhead which may advantageously decrease the physical size of the tag cache and/or increase the number of entries which may be stored in the tag cache. In some embodiments, a group-based replacement policy may fetch the metadata and tag information of the missing line as well as its adjacent lines into the tag cache. Some embodiments may advantageously reduce the tag cache misses by prefetching the information of the following requests.

In some implementations, a tag cache may be used to cache the metadata and tag information of the near memory (NM) in a 2LM system. In some other systems, the tag cache may cache the information of the near LRU positions of each NM set. For a 16-way set associative NM with a tag cache to store the tag and metadata information of a half size NM, for example, the tag cache may store the tag and metadata of the NM lines residing at LRU positions 0-7 in each NM set. For a per-line based replacement policy, on each tag cache miss the tag and metadata of the missed line will be brought into the tag cache entry. The tag cache entry for a per-line based policy may include a way identification (way ID) field to keep track of the way number of the corresponding line stored in NM. For a 16-way set associative NM, the per-line based policy requires four (4)-bits in each tag cache entry to store the way ID information in the tag cache entry (e.g., which may be twenty five percent (25%) of the tag cache capacity for a sixteen (16)-bit tag cache entry).

Figure 4:
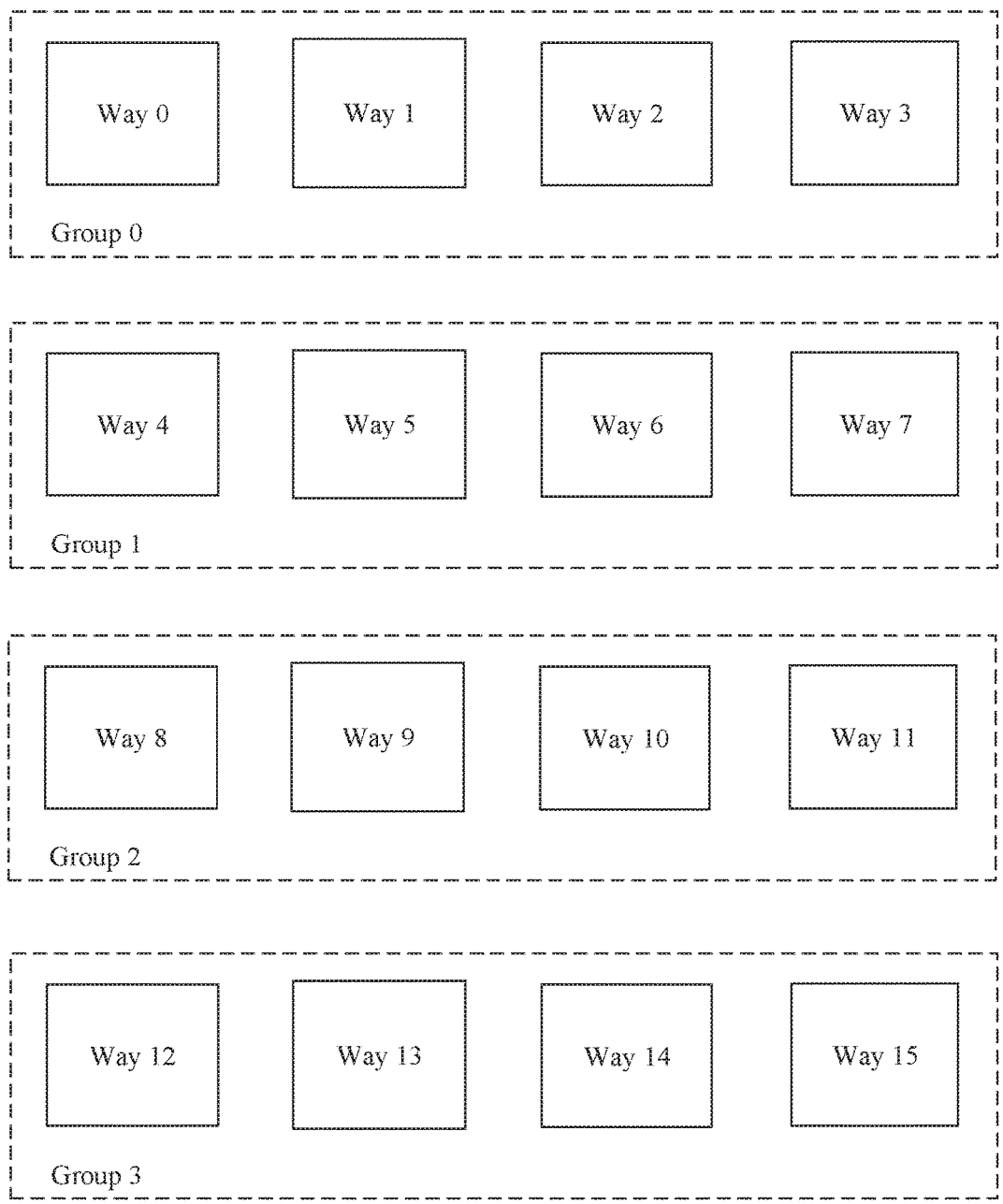
FIG. 4 is an illustrative diagram of an example of groups of ways according to an embodiment.

Turning now to FIG. 4, some embodiments may provide a coarse grain tag cache replacement policy where, for example, on each tag cache miss the tag and metadata of a group of N lines including the missing line as well as its adjacent line(s) are brought into the tag cache. For a 16-way set associative NM and where the tag cache may store the tag and metadata information of a half size NM, the tag cache may be an 8-way set associative cache. For a 16-line NM set, some embodiments may logically divide the sets into four groups based on their corresponding way IDs. As shown in FIG. 4, for example, way 0 to way 3 may be in group 0, way 4 to way 7 may be in group 1, way 8 to way 11 may be in group 2, and way 12 to way 15 may be in group 3.

Figure 5:
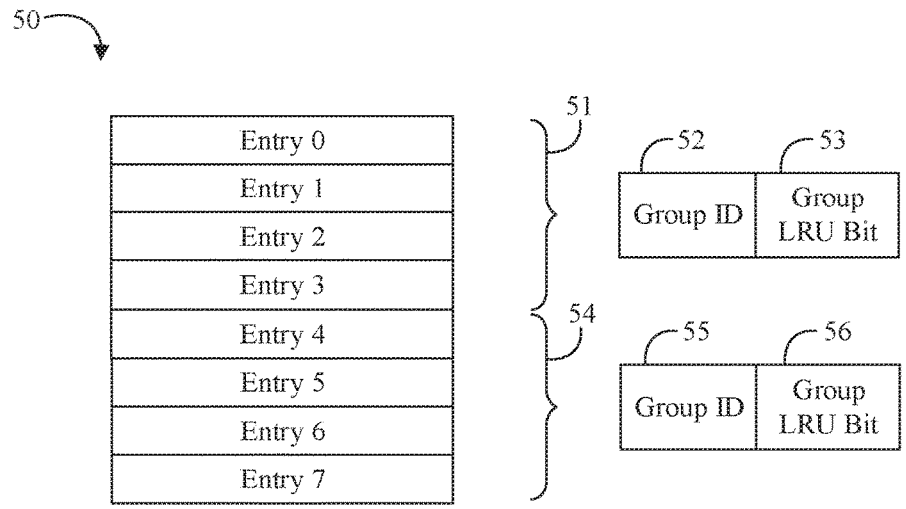
FIG. 5 is an illustrative diagram of an example of a tag cache structure according to an embodiment.

Turning now to FIG. 5, a portion of a tag cache 50 may include tag cache entries 0 through 7. One group of tag cache entries 51 may include entries 0 through 3, grouped with a corresponding group ID 52 and a corresponding group LRU bit 53. Another group of tag cache entries 54 may include entries 4 through 7, grouped with a corresponding group ID 55 and a corresponding group LRU bit 56. For an example sixteen (16) way NM (e.g., 4-bit way IDs) with a group size of N=4, which corresponds to bringing the information of a group of 4 lines into the tag cache 50 if there is a tag cache miss request, every 4 tag cache entries may share a 2-bit group ID field and a 1-bit group LRU field. For example, the group ID may be the leading 2-bits of the corresponding way ID. Advantageously, instead of 4-bits of way ID and 1-bit of LRU state for each of four tag cache entries (5 bits*4 entries=20 bits total), some embodiments may store a 2-bit group ID and 1-bit group LRU bit for every 4 tag cache entries (3 bits total). In accordance with some embodiments, no extra metadata bits may be needed in the NM for the group ID because the group ID may be determined, derived, and/or calculated from the way ID (e.g., some embodiments may simply use the leading 2-bits of the way ID as the group ID).

In some embodiments, if there is a tag cache miss request, the metadata and tag information of its corresponding group may be brought into the tag cache. The value of the leading way ID may be stored in the tag cache and may correspond to the same value as the group ID. If there is a tag cache hit request, the NM way ID of the request may be derived from the group ID as follows:

$$\text{NM way ID} = \text{group ID}*(\text{number of groups in one NM set}) + \text{entry number} \mathbin{\&} ((1 \ll \text{Log number of lines in NM group}) - 1)$$

For instance, assuming the hit entry is entry 5 and the leading way ID for its corresponding group is 2, the NM way ID can be calculated as following:

$$\text{NM way ID} = 2*4 + 5 \mathbin{\&} ((1 \ll 2) - 1) = 9$$

Each group in the tag cache set may have an LRU bit. On a tag cache hit, the corresponding group LRU bit may be updated. On a tag cache miss, if an eviction is needed, the victim group may be selected based on the group LRU bit.

Simulation Results

Figure 6:
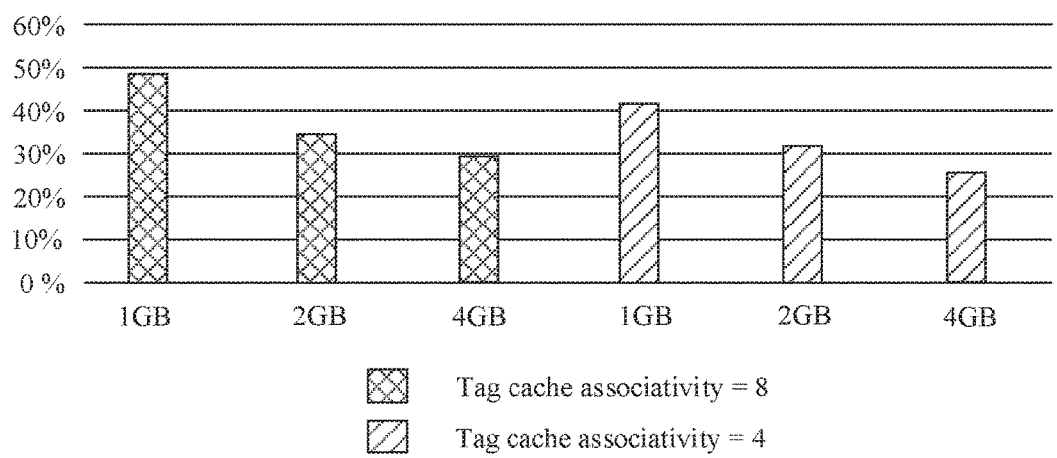
FIG. 6 is an illustrative graph of example simulation results according to an embodiment.

Turning to FIG. 6, an illustrative graph shows examples of numbers of tag cache misses for a coarse grain tag cache replacement policy according to some embodiments normalized against a per-line tag cache replacement policy for various simulation results. A near memory simulator was utilized to simulate various NM sizes including 1 GB, 2 GB, and 4 GB NM capacities. The simulated NM had a 16-way associativity. For the 8-way set associative tag cache configuration (half of the 16 ways), each group consisted of 4 entries. For the 4-way set associative tag cache configuration (one quarter of the 16 ways), each group consisted of 2 entries. A per-line tag cache replacement policy was also simulated with the same tag cache capacity as the coarse grain replacement policy (i.e., 6-way set associative and 3-way set associative tag caches were evaluated for the per-line replacement policy to correspond to the same storage overhead as the 8-way set associative and 4-way set associative tag cache using the coarse grain replacement policy). As shown in FIG. 6, some embodiments of a coarse grain replacement policy may significantly reduce the tag cache misses (e.g., by more than 50% on average) as compared to a per-line replacement policy for all the simulated configurations. Advantageously, improving the tag cache hit rate may also improve the 2LM efficiency, the system performance, and/or reduce the power consumption.

ADDITIONAL NOTES AND EXAMPLES

Example 1 may include an electronic processing system, comprising a processor, persistent storage media communicatively coupled to the processor, a tag cache to cache tag information, and a memory controller communicatively coupled to the processor and the tag cache to determine if a request for a memory line results in a tag cache miss, bring tag information for a group of memory lines into the tag cache if the request results in a tag cache miss, the group of memory lines including the missed memory line and at least one additional memory line adjacent to the missed memory line, and provide a group identification for a group of tag cache entries which correspond to the group of memory lines.

Example 2 may include the system of Example 1, wherein the group identification corresponds to a group of ways.

Example 3 may include the system of Example 2, wherein the group identification is based on a corresponding way identification.

Example 4 may include the system of Example 3, wherein the group identification is determined from leading bits of a corresponding way identification.

Example 5 may include the system of any of Examples 2 to 4, the memory controller is further to provide a group replacement state for the group of tag cache entries.

Example 6 may include the system of Example 5, wherein the memory controller is further to select a group of tag cache entries for eviction based on the group replacement state of the group of tag cache entries.

Example 7 may include a memory apparatus, comprising a tag cache to cache tag information, and a memory controller communicatively coupled to the tag cache to determine if a request for a memory line results in a tag cache miss, bring tag information for a group of memory lines into the tag cache if the request results in a tag cache miss, the group of memory lines including the missed memory line and at least one additional memory line adjacent to the missed memory line, and provide a group identification for a group of tag cache entries which correspond to the group of memory lines.

Example 8 may include the apparatus of Example 7, wherein the group identification corresponds to a group of ways.

Example 9 may include the apparatus of Example 8, wherein the group identification is based on a corresponding way identification.

Example 10 may include the apparatus of Example 9, wherein the group identification is determined from leading bits of the corresponding way identification.

Example 11 may include the apparatus of any of Examples 8 to 10, the memory controller is further to provide a group replacement state for the group of tag cache entries.

Example 12 may include the apparatus of Example 11, wherein the memory controller is further to select a group of tag cache entries for eviction based on the group replacement state of the group of tag cache entries.

Example 13 may include a method of controlling memory, comprising determining if a request for a memory line results in a tag cache miss, bringing tag information for a group of memory lines into the tag cache if the request results in a tag cache miss, the group of memory lines including the missed memory line and at least one additional memory line adjacent to the missed memory line, and providing a group identification for a group of tag cache entries which correspond to the group of memory lines.

Example 14 may include the method of Example 13, wherein the group identification corresponds to a group of ways.

Example 15 may include the method of Example 14, further comprising determining the group identification based on a corresponding way identification.

Example 16 may include the method of Example 15, further comprising determining the group identification from leading bits of the corresponding way identification.

Example 17 may include the method of any of Examples 14 to 16, further comprising providing a group replacement state for the group of tag cache entries.

Example 18 may include the method of Example 17, further comprising selecting a group of tag cache entries for eviction based on the group replacement state of the group of tag cache entries.

Example 19 may include at least one computer readable medium, comprising a set of instructions, which when executed by a computing device, cause the computing device to determine if a request for a memory line results in a tag cache miss, bring tag information for a group of memory lines into the tag cache if the request results in a tag cache miss, the group of memory lines including the missed memory line and at least one additional memory line adjacent to the missed memory line, and provide a group identification for a group of tag cache entries which correspond to the group of memory lines.

Example 20 may include the at least one computer readable medium of Example 19, wherein the group identification corresponds to a group of ways.

Example 21 may include the at least one computer readable medium of Example 20, comprising a further set of instructions, which when executed by a computing device, cause the computing device to determine the group identification based on a corresponding way identification.

Example 22 may include the at least one computer readable medium of Example 21, comprising a further set of instructions, which when executed by a computing device, cause the computing device to determine the group identification from leading bits of the corresponding way identification.

Example 23 may include the at least one computer readable medium of any of Examples 20 to 22, comprising a further set of instructions, which when executed by a computing device, cause the computing device to provide a group replacement state for the group of tag cache entries.

Example 24 may include the at least one computer readable medium of Example 23, comprising a further set of instructions, which when executed by a computing device, cause the computing device to select a group of tag cache entries for eviction based on the group replacement state of the group of tag cache entries.

Example 25 may include a memory apparatus, comprising means for determining if a request for a memory line results in a tag cache miss, means for bringing tag information for a group of memory lines into the tag cache if the request results in a tag cache miss, the group of memory lines including the missed memory line and at least one additional memory line adjacent to the missed memory line, and means for providing a group identification for a group of tag cache entries which correspond to the group of memory lines.

Example 26 may include the apparatus of Example 25, wherein the group identification corresponds to a group of ways.

Example 27 may include the apparatus of Example 26, further comprising means for determining the group identification based on a corresponding way identification.

Example 28 may include the apparatus of Example 27, further comprising means for determining the group identification from leading bits of the corresponding way identification.

Example 29 may include the apparatus of any of Examples 26 to 28, further comprising means for providing a group replacement state for the group of tag cache entries.

Example 30 may include the apparatus of Example 29, further comprising means for selecting a group of tag cache entries for eviction based on the group replacement state of the group of tag cache entries.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
a tag cache to cache tag information; and
a memory controller communicatively coupled to the processor and the tag cache to:
  make a determination that a request for a memory line results in a tag cache miss,
  bring tag information for a group of memory lines into the tag cache based on the determination that the request results in the tag cache miss, the group of memory lines including the memory line that is missed and at least one additional memory line adjacent to the memory line that is missed, and
  provide a group identification for a group of tag cache entries which correspond to the group of memory lines, wherein the group identification corresponds to a group of a plurality of ways, and wherein the group identification is based on a way identification shared by the group of the plurality of ways.

2. The system of claim 1, wherein the group identification is determined from leading bits of the way identification.

3. The system of claim 1, the memory controller is further to:
provide a group replacement state for the group of tag cache entries.

4. The system of claim 3, wherein the memory controller is further to:
select a group of tag cache entries for eviction based on the group replacement state of the group of tag cache entries.

5. A memory apparatus, comprising:
a tag cache to cache tag information; and
a memory controller communicatively coupled to the tag cache to:
  make a determination that a request for a memory line results in a tag cache miss,
  bring tag information for a group of memory lines into the tag cache based on the determination that the request results in the tag cache miss, the group of memory lines including the memory line that is missed and at least one additional memory line adjacent to the memory line that is missed, and
  provide a group identification for a group of tag cache entries which correspond to the group of memory lines, wherein the group identification corresponds to a group of a plurality of ways, and wherein the group identification is based on a way identification shared by the group of the plurality of ways.

6. The apparatus of claim 5, wherein the group identification is determined from leading bits of the way identification.

7. The apparatus of claim 5, the memory controller is further to:
provide a group replacement state for the group of tag cache entries.

8. The apparatus of claim 7, wherein the memory controller is further to:

select a group of tag cache entries for eviction based on the group replacement state of the group of tag cache entries.

9. A method of controlling memory, comprising:
making a determination that a request for a memory line results in a tag cache miss;
bringing tag information for a group of memory lines into the tag cache based on the determination that the request results in the tag cache miss, the group of memory lines including the memory line that is missed and at least one additional memory line adjacent to the memory line that is missed; and
providing a group identification for a group of tag cache entries which correspond to the group of memory lines, wherein the group identification corresponds to a group of a plurality of ways, and wherein the group identification is based on a way identification shared by the group of the plurality of ways.

10. The method of claim 9, further comprising:
determining the group identification from leading bits of the way identification.

11. The method of claim 9, further comprising:
providing a group replacement state for the group of tag cache entries.

12. The method of claim 11, further comprising:
selecting a group of tag cache entries for eviction based on the group replacement state of the group of tag cache entries.

13. At least one computer readable medium, comprising a set of instructions, which when executed by a computing device, cause the computing device to:
make a determination that a request for a memory line results in a tag cache miss,
bring tag information for a group of memory lines into the tag cache based on the determination that the request results in the tag cache miss, the group of memory lines including the memory line that is missed and at least one additional memory line adjacent to the memory line that is missed; and
provide a group identification for a group of tag cache entries which correspond to the group of memory lines, wherein the group identification corresponds to a group of a plurality of ways, and wherein the group identification is based on a way identification shared by the group of the plurality of ways.

14. The at least one computer readable medium of claim 13, comprising a further set of instructions, which when executed by a computing device, cause the computing device to:
determine the group identification from leading bits of the way identification.

15. The at least one computer readable medium of claim 13, comprising a further set of instructions, which when executed by a computing device, cause the computing device to:
provide a group replacement state for the group of tag cache entries.

16. The at least one computer readable medium of claim 15, comprising a further set of instructions, which when executed by a computing device, cause the computing device to:
select a group of tag cache entries for eviction based on the group replacement state of the group of tag cache entries.

* * * * *